United States Patent
Kim

(10) Patent No.: US 11,627,304 B2
(45) Date of Patent: Apr. 11, 2023

(54) TRANSPARENT DISPLAY DEVICE, AND THREE-DIMENSIONAL IMAGE DISPLAY APPARATUS COMPRISING SAME

(71) Applicant: TOVIS CO., LTD., Incheon (KR)

(72) Inventor: Yong Beom Kim, Incheon (KR)

(73) Assignee: TOVIS CO., LTD., Incheon (KR)

( * ) Notice: Subject to any disclaimer, the term of this patent is extended or adjusted under 35 U.S.C. 154(b) by 189 days.

(21) Appl. No.: 17/264,850

(22) PCT Filed: Jul. 29, 2019

(86) PCT No.: PCT/KR2019/009419
§ 371 (c)(1),
(2) Date: Feb. 1, 2021

(87) PCT Pub. No.: WO2020/027527
PCT Pub. Date: Feb. 6, 2020

(65) Prior Publication Data
US 2021/0235069 A1 Jul. 29, 2021

(30) Foreign Application Priority Data

Aug. 3, 2018 (KR) .................. 10-2018-0090669

(51) Int. Cl.
*H04N 13/393* (2018.01)
*G09F 19/12* (2006.01)

(52) U.S. Cl.
CPC ......... *H04N 13/393* (2018.05); *G09F 19/125* (2021.05); *H04N 2213/001* (2013.01)

(58) Field of Classification Search
CPC .......... G09F 11/12; G09F 13/34; G09F 19/02; G09F 19/125; G09F 19/20; H04N 13/393; H04N 13/395

USPC .......................................................... 348/51
See application file for complete search history.

(56) References Cited

U.S. PATENT DOCUMENTS

2008/0094323 A1* 4/2008 Sirmon ................. G03B 25/02
348/E9.026
2018/0322818 A1* 11/2018 O'Brien ................ G06T 15/005

FOREIGN PATENT DOCUMENTS

| JP | 2002-182590 A | 6/2002 |
|---|---|---|
| JP | 2002182590 A * | 6/2002 |
| JP | 2004-187729 A | 7/2004 |
| JP | 2008-511034 A | 4/2008 |
| JP | 3208019 U | 12/2016 |

(Continued)

OTHER PUBLICATIONS

Machine Translation of JP-2002182590-A (Year: 2002).*

(Continued)

*Primary Examiner* — Christopher S Kelley
*Assistant Examiner* — Ana Picon-Feliciano
(74) *Attorney, Agent, or Firm* — Revolution IP, PLLC

(57) ABSTRACT

A transparent display device includes an image display bar in which a plurality of light-emitting elements are arranged, and a bar driving unit which moves the image display bar along a predetermined path and provides transparent display using afterimages resulting from the movement of the light-emitting elements, wherein the transparency of the transparent display using afterimages is determined by the equation, transparency (%)=((A−B)/A)*100, where A denotes the entire display area of the transparent display, and B denotes the area of the image display bar.

12 Claims, 19 Drawing Sheets

(56) References Cited

FOREIGN PATENT DOCUMENTS

| KR | 10-0903888 B1 | 6/2009 |
| KR | 10-1445976 B1 | 10/2014 |
| KR | 10-1796708 B1 | 11/2017 |

OTHER PUBLICATIONS

Relative change and difference Wikipedia 2016 ( Relative change and difference, https://web.archive.org/web/20161216005430/https://en.wikipedia.org/wiki/Relative_change_and_difference, Nov. 27, 2016, pp. 6) (Year: 2016).*
International Search Report for PCT/KR2019/009419 dated Nov. 6, 2019 from Korean Intellectual Property Office.

* cited by examiner

[FIG.1]
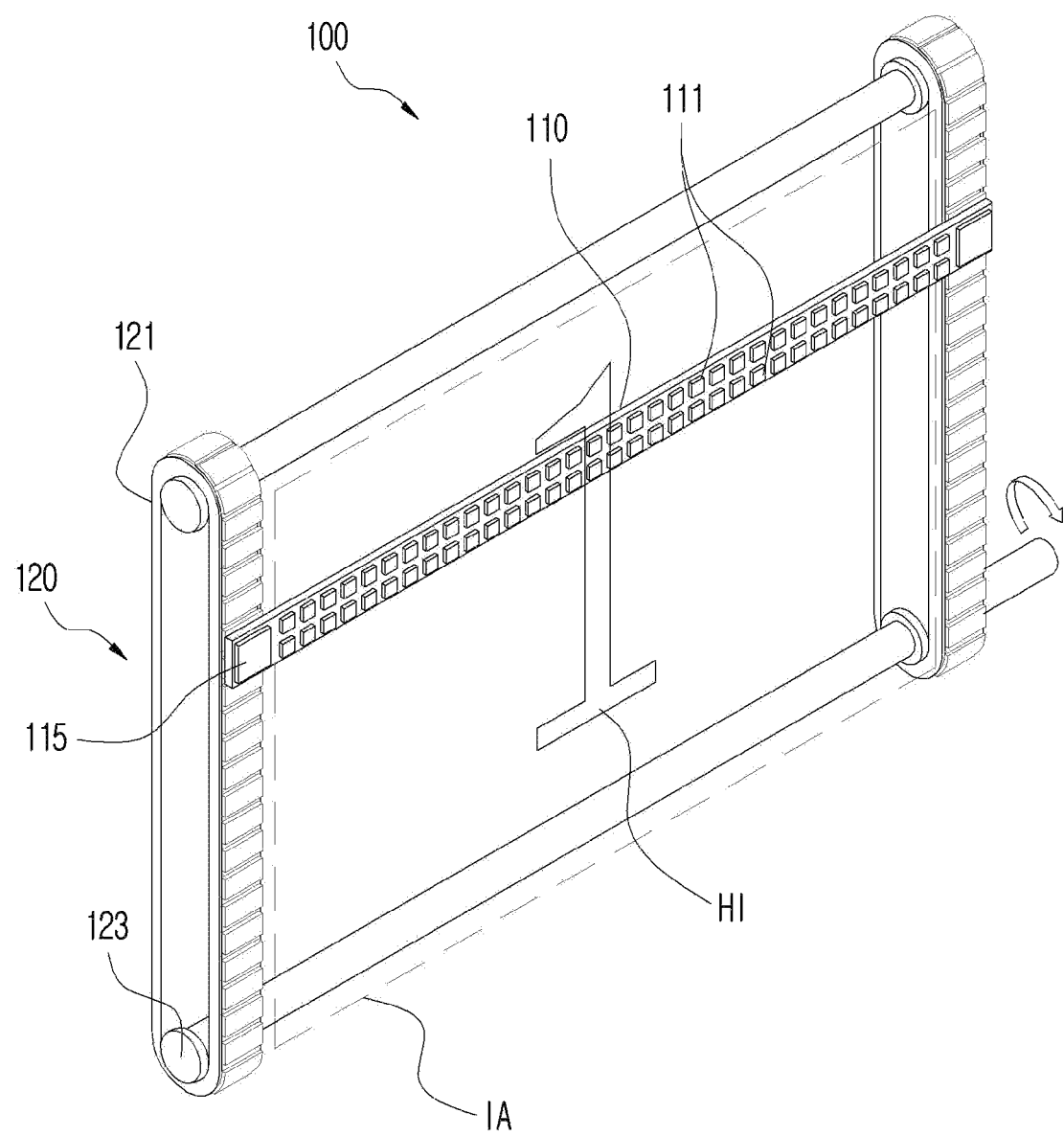

[FIG.2]
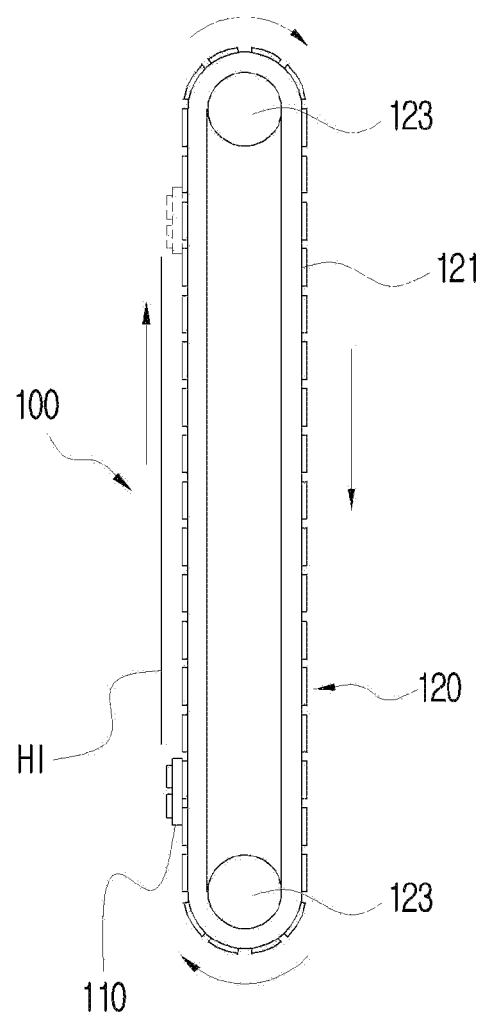

[FIG.3]
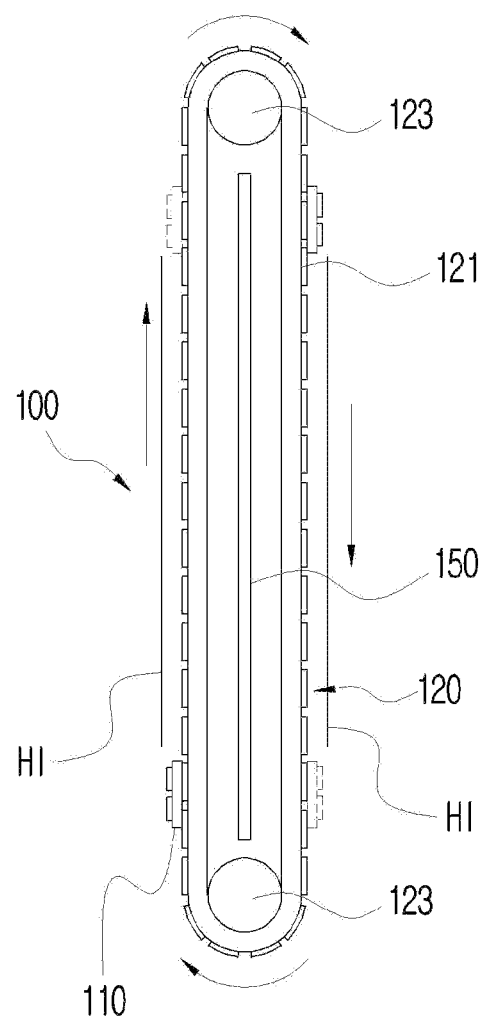

[FIG.4]
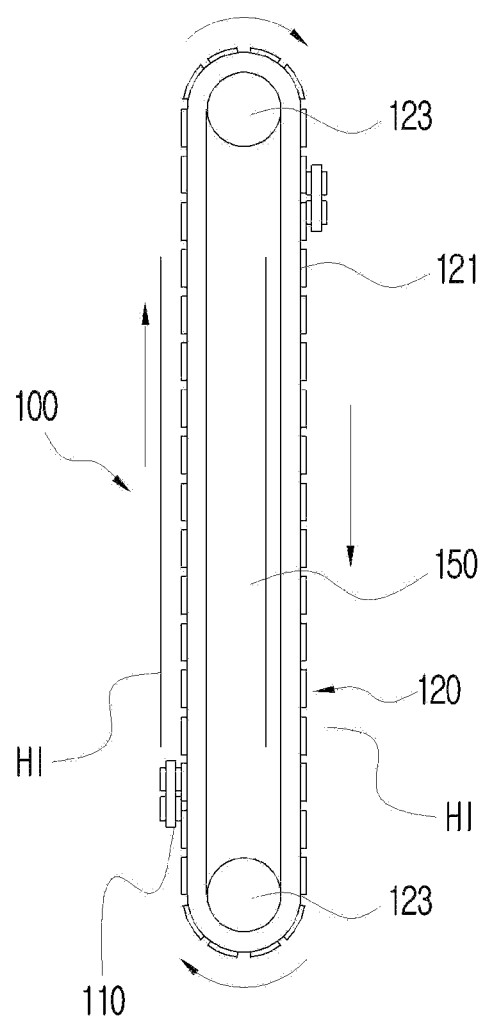

[FIG.5]
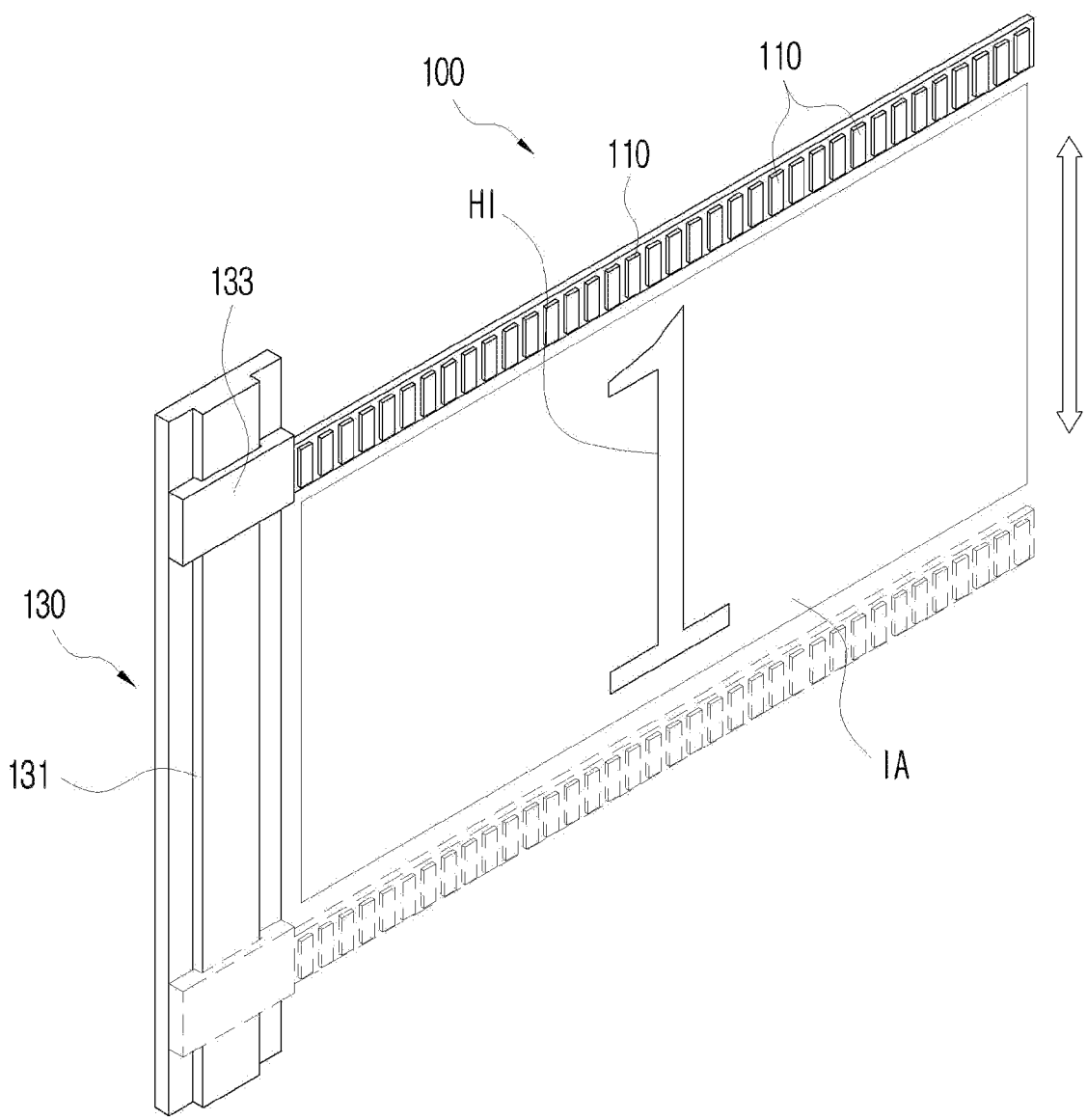

[FIG.6]
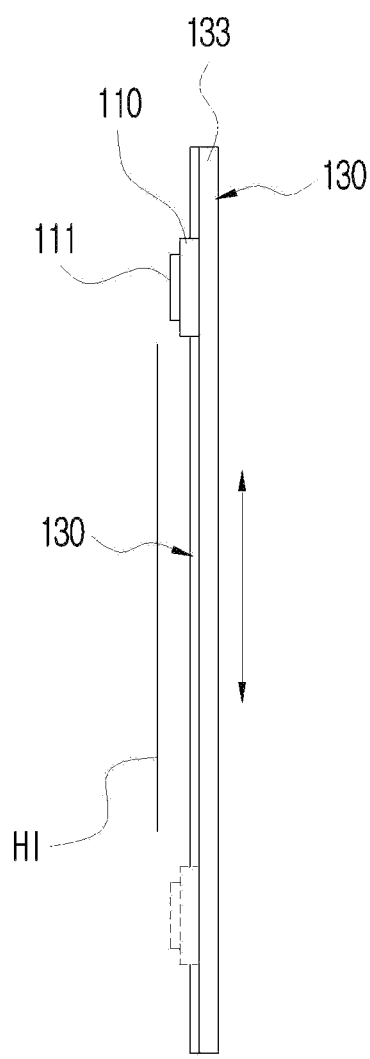

[FIG.7]
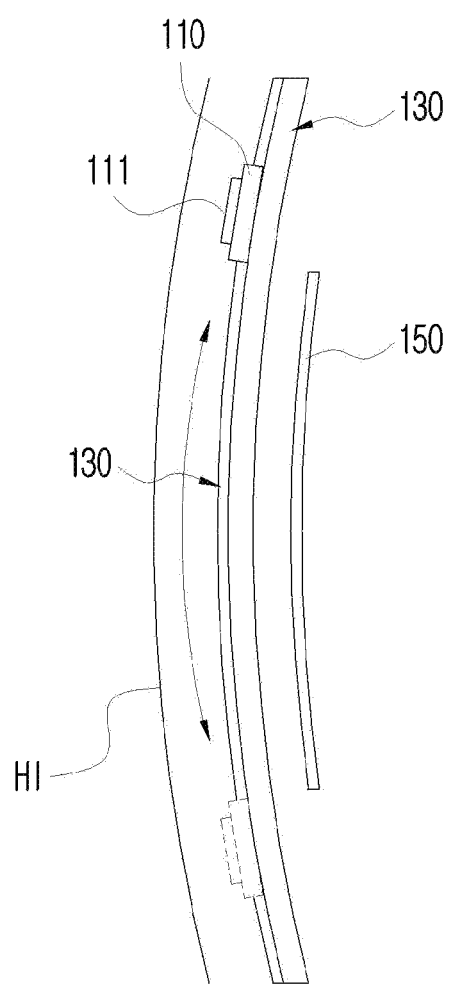

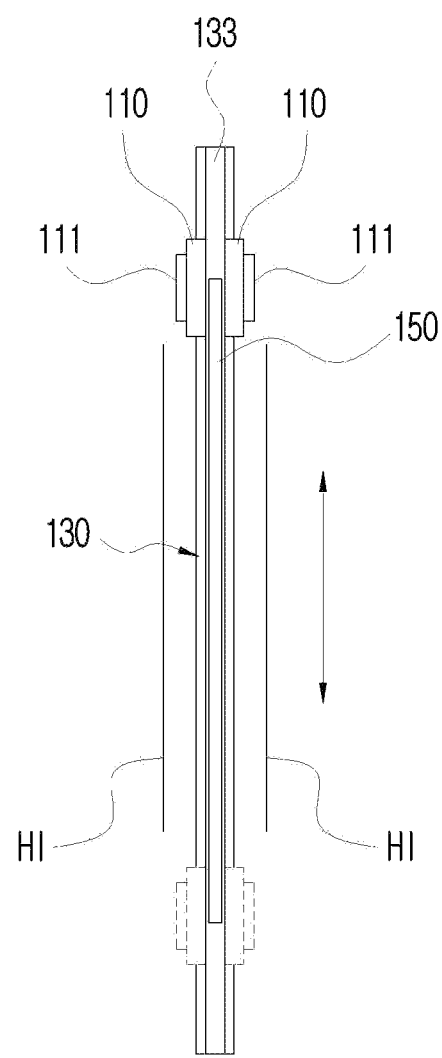
[FIG.8]

[FIG.9]
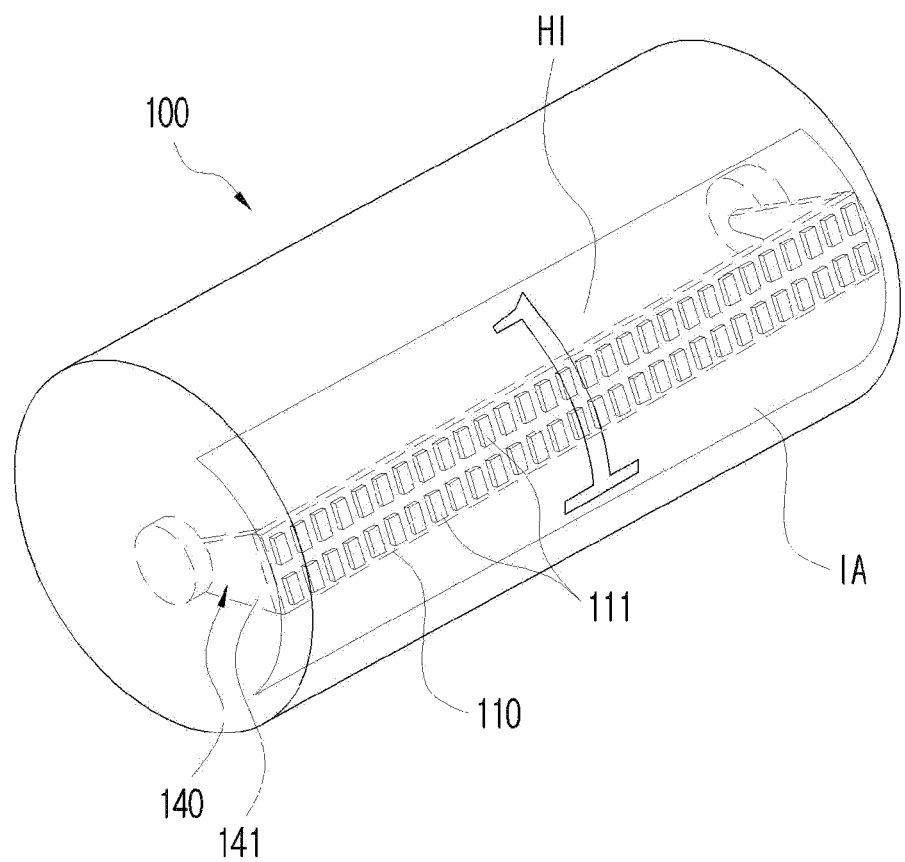

[FIG.10]
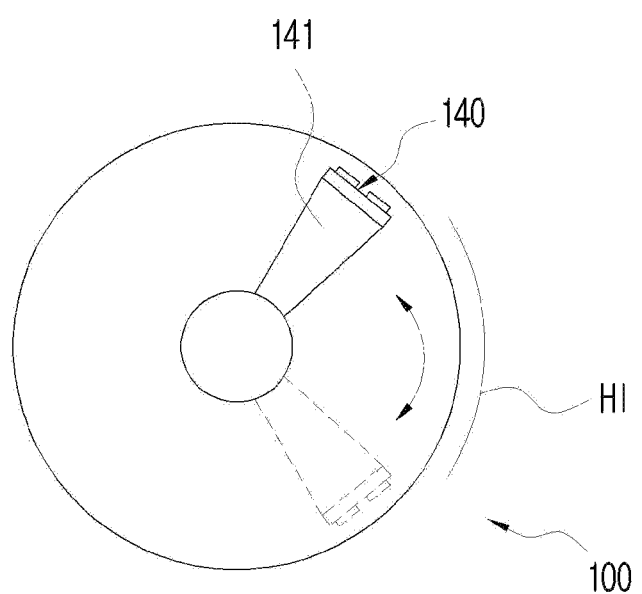

[FIG.11]
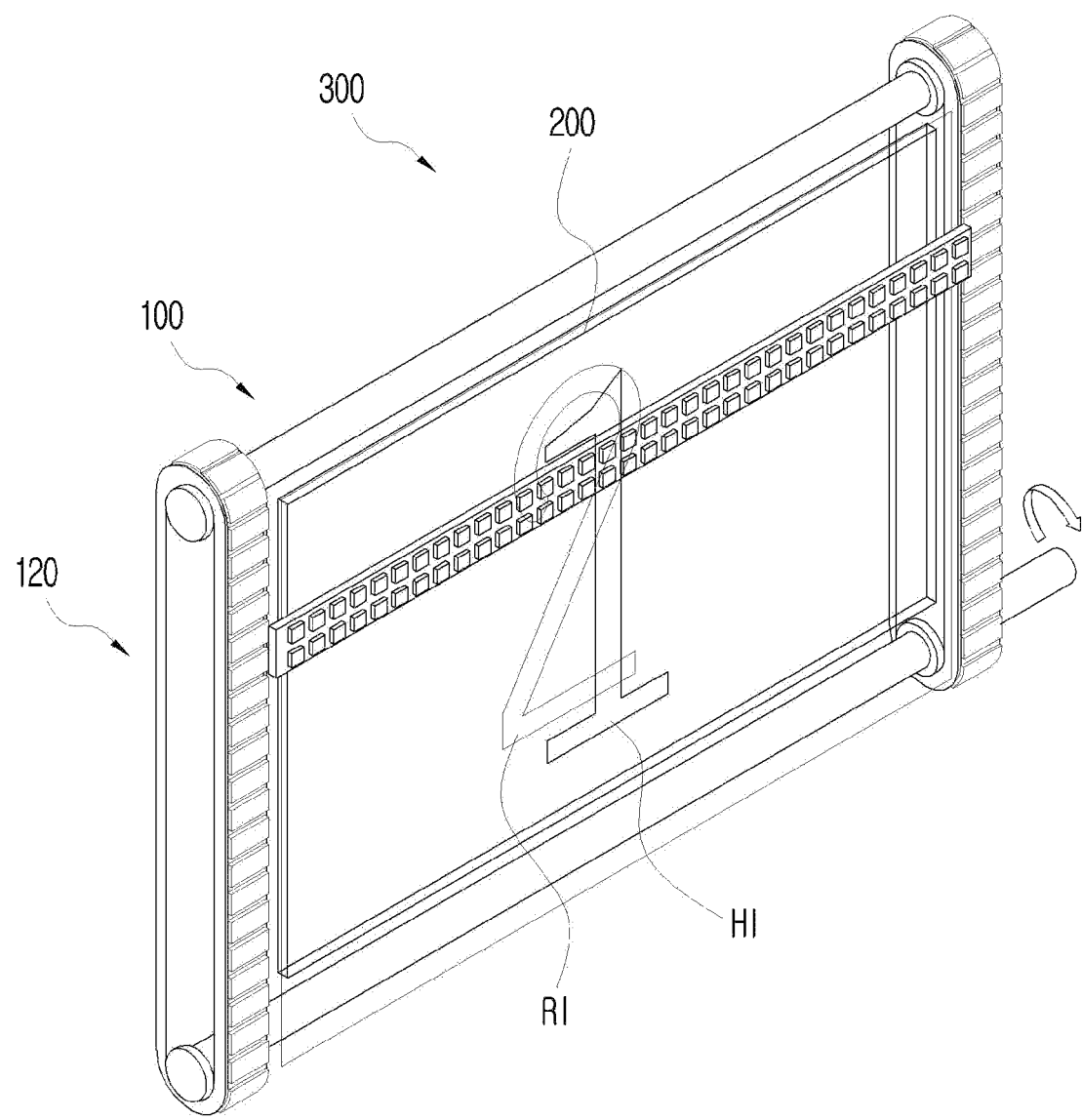

[FIG.12]
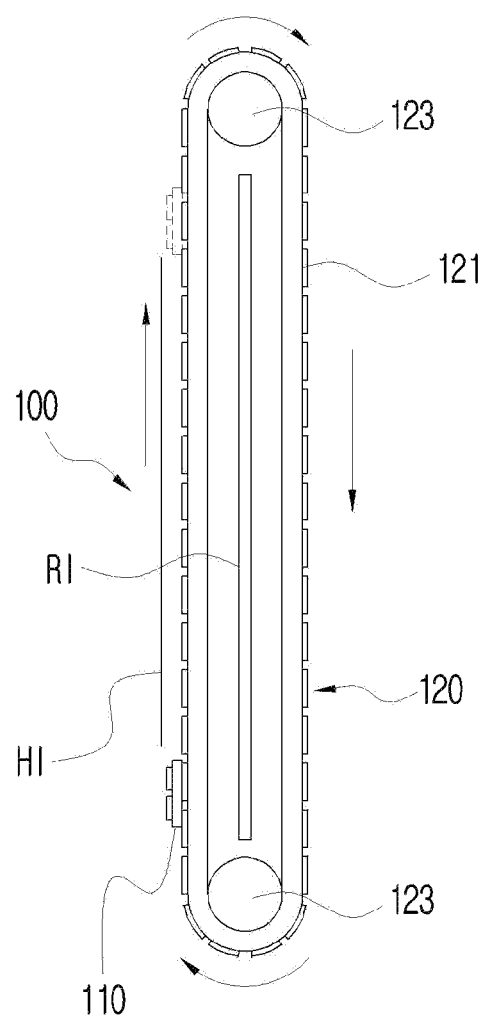

[FIG.13]
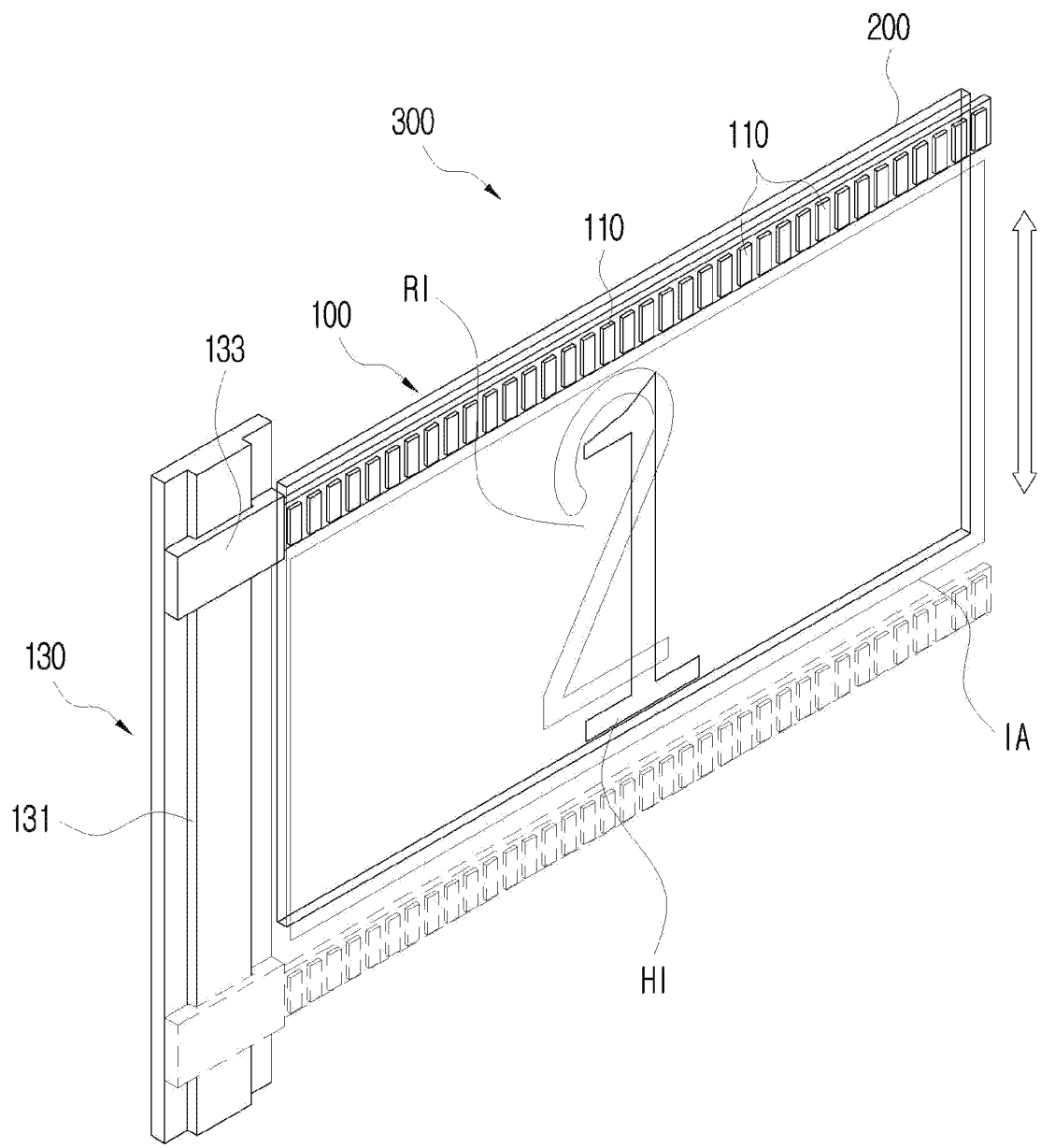

[FIG.14]
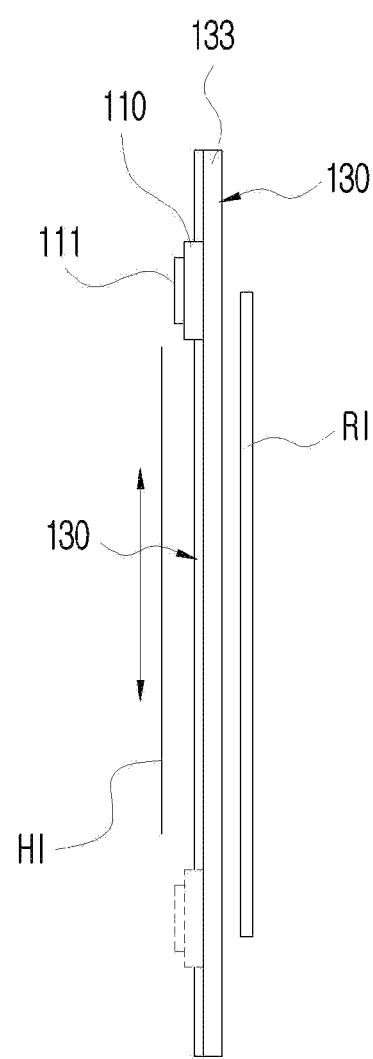

[FIG.15]
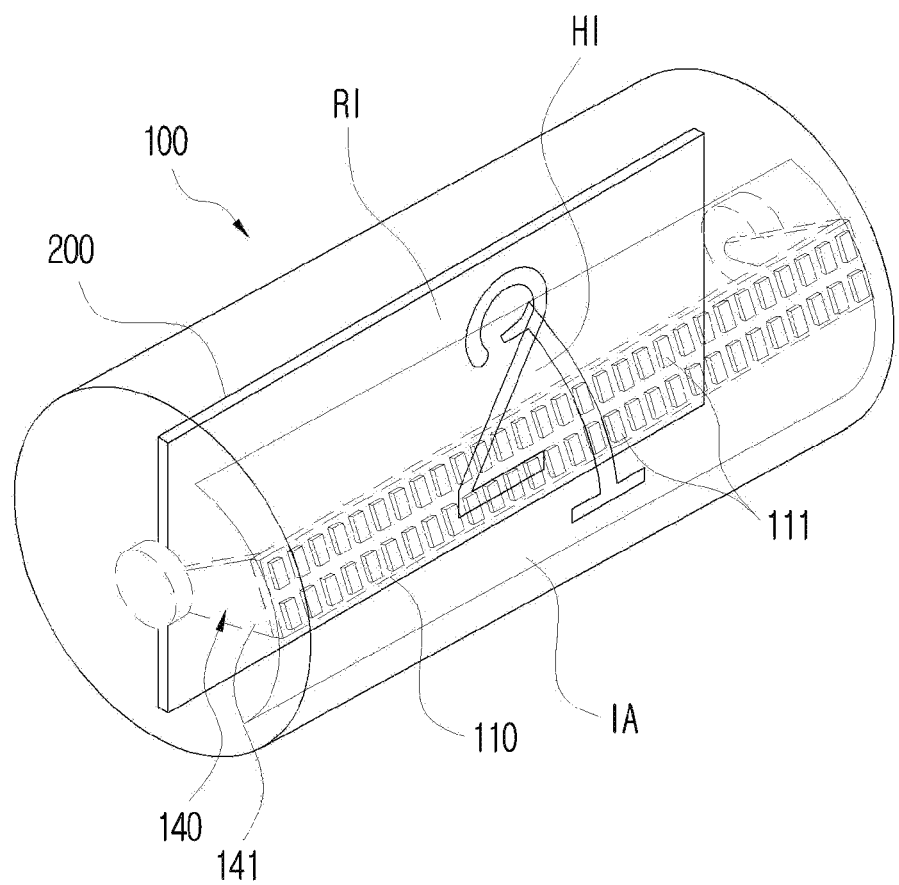

[FIG.16]
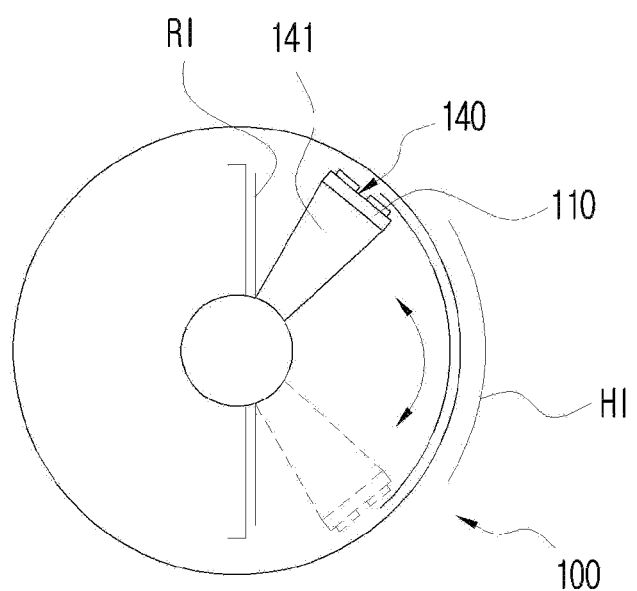

[FIG.17]
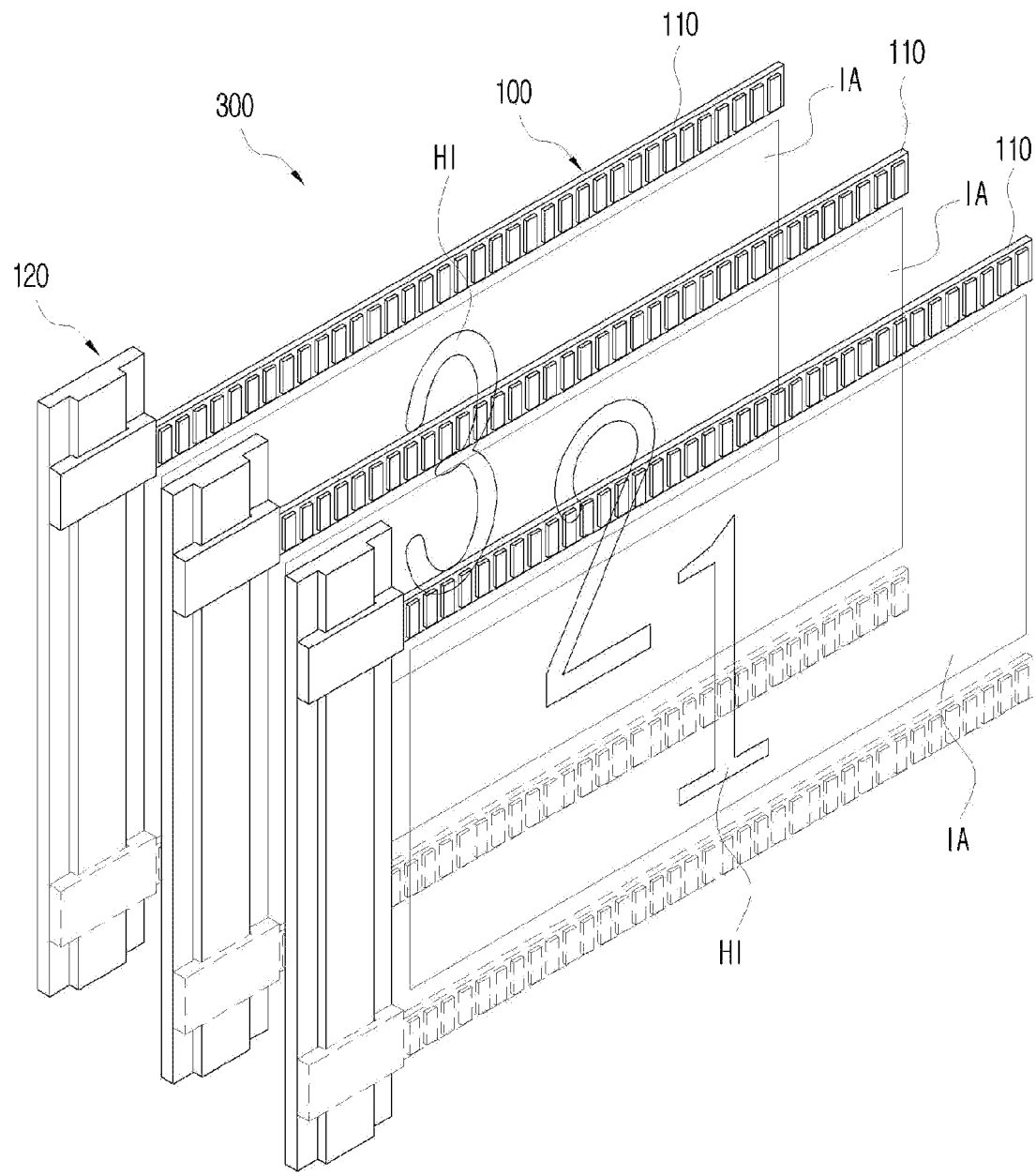

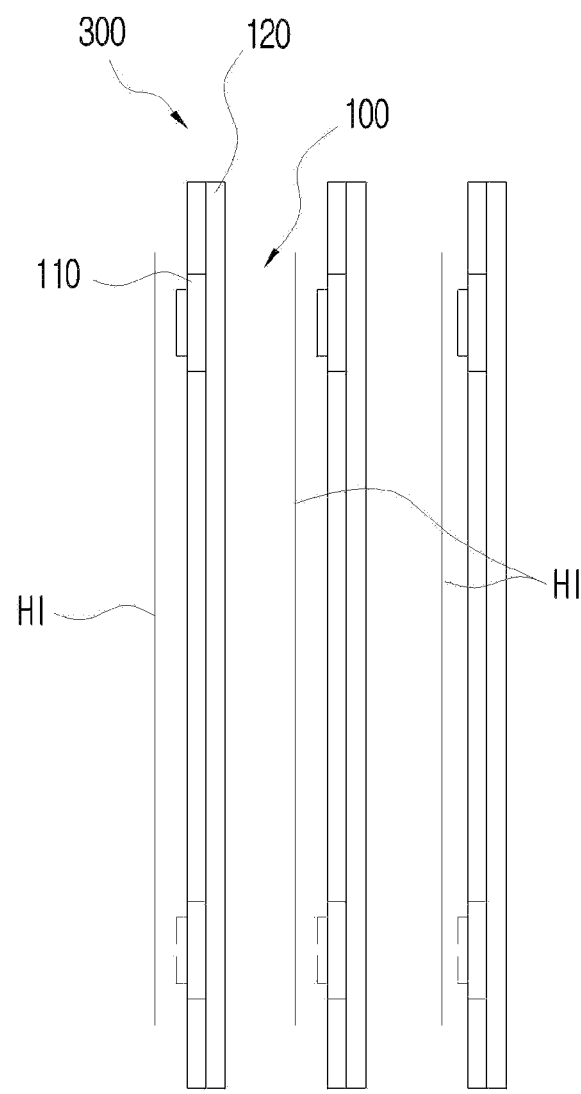

[FIG.19]
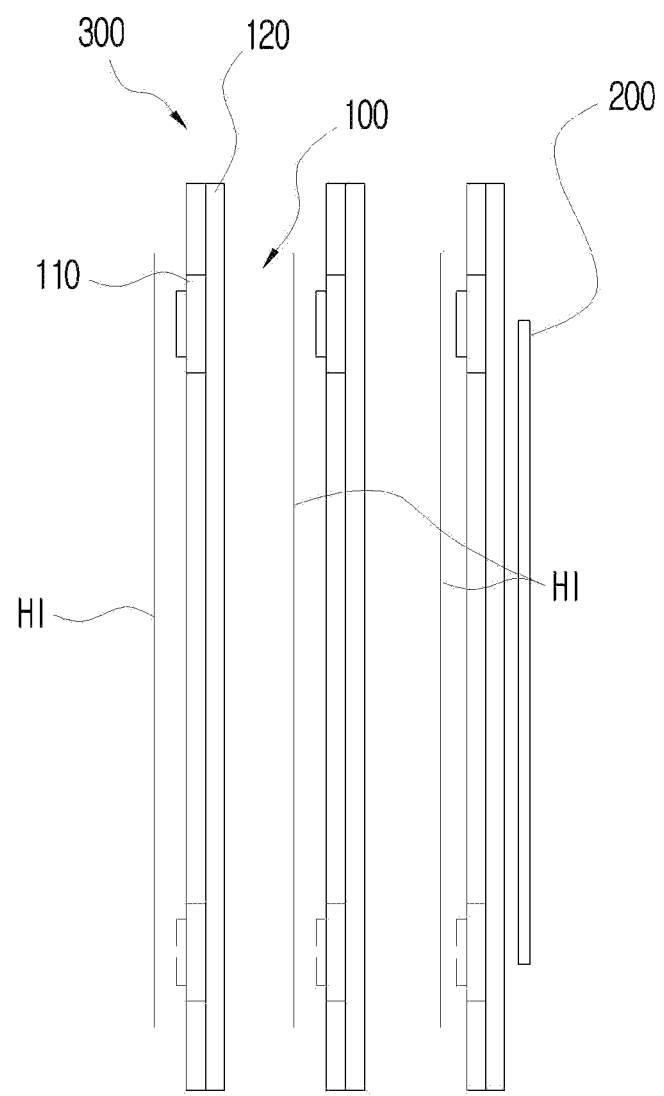

TRANSPARENT DISPLAY DEVICE, AND THREE-DIMENSIONAL IMAGE DISPLAY APPARATUS COMPRISING SAME

TECHNICAL FIELD

The present invention relates to a display device that displays an image.

BACKGROUND ART

In general, a display device is a device for displaying an image.

The display device displays an image according to an electrical signal. Since the rear surface of the display apparatus is not visible due to transmission of light, however, utilization of the display device is not high except for the use of displaying an image.

In order to solve this, conventionally, a "composite image display device" of Korean Registered Patent Publication No. 10-1796708 was disclosed.

In the conventional composite image display device, a transparent display panel is installed at the front of a screen such that an image displayed on the transparent display panel and an image displayed on the screen are visible in combination with each other, whereby a three-dimensional effect of the images is improved.

Since the transparent display panel is installed at the front of the conventional composite image display device, however, transmittance of light is low even in the case in which no image is displayed on the transparent display panel, whereby it is difficult to clearly watch an image on the screen located at the rear of the transparent display panel.

In addition, there is a problem in that transmittance of the transparent display panel cannot be adjusted.

DISCLOSURE

Technical Problem

The present invention has been made in view of the above problems, and it is an object of the present invention to provide a transparent display device capable of preventing deterioration in visibility of an image due to transmittance thereof when a display panel is not used while transmittance of the transparent display device is adjustable and a three-dimensional image display apparatus including the same.

Technical Solution

A transparent display device according to an embodiment of the present invention to accomplish the above object includes an image display bar having a plurality of light-emitting devices arranged thereon and a bar driving unit configured to move the image display bar along a predetermined path such that the image display bar provides a transparent display using an afterimage according to movement of the light-emitting devices, wherein, assuming that the entire display area of the transparent display using the afterimage is A and the area of the image display bar is B, transparency of the transparent display is set according to the equation of transparency $(\%)=((A-B)/A)*100$.

The bar driving unit may include a driving belt to which the image display bar is fixed, the driving belt being configured to successively perform rectilinear movement for the image display bar and direction changing movement for changing the direction of the rectilinear movement, and a driving motor configured to rotate the driving belt.

The transparent display may be a rectangular display formed by the rectilinear movement of the image display bar.

The image display bar may be installed at the driving belt in numbers.

The bar driving unit may include a linear motor configured to rectilinearly reciprocate the image display bar.

The bar driving unit may include a circular guide configured to move the image display bar in a circle or in an arc.

The image display bar may include a pair of image display bars installed at the bar driving unit such that the light-emitting devices are opposite each other, and the transparent display device may include a blocking plate disposed between the pair of image display bars, the blocking plate being configured to block light between transparent displays using afterimages.

A three-dimensional image display apparatus according to an embodiment of the present invention includes a transparent display device including an image display bar having a plurality of light-emitting devices arranged thereon and a bar driving unit configured to move the image display bar along a predetermined path such that the image display bar provides a transparent display using an afterimage according to movement of the light-emitting devices and an opaque display panel located at the rear of the image display bar, the opaque display panel being configured to provide an opaque display at the rear of the transparent display using the afterimage.

Assuming that the entire display area of the transparent display using the afterimage is A and the area of the image display bar is B, transparency of the transparent display may be set according to the equation of transparency $(\%)=((A-B)/A)*100$.

The bar driving unit may include a driving belt configured to successively perform rectilinear movement for the image display bar and direction changing movement for changing the direction of the rectilinear movement through rotation thereof and a driving motor configured to rotate the driving belt.

The image display bar may be installed at the driving belt in numbers.

The bar driving unit may include a linear motor configured to rectilinearly reciprocate the image display bar.

The bar driving unit may include a circular guide configured to move the image display bar in a circle or in an arc.

The image display bar may include a pair of image display bars installed at the bar driving unit such that the light-emitting devices are opposite each other, and the transparent display device may include a blocking plate disposed between the pair of image display bars, the blocking plate being configured to block light between transparent displays using afterimages.

A three-dimensional image display apparatus according to another embodiment of the present invention includes a transparent display device including an image display bar having a plurality of light-emitting devices arranged thereon and a bar driving unit configured to move the image display bar along a predetermined path such that a transparent display using an afterimage is provided by the light-emitting devices, wherein, assuming that the entire display area of the transparent display using the afterimage is A and the area of the image display bar is B, transparency of the transparent display is set according to an equation of transparency $(\%)=((A-B)/A)*100$, wherein the transparent display device includes a plurality of transparent display devices such that a plurality of transparent displays using afterimages is visible in an overlapping state, and wherein bar driving units of the plurality of transparent display devices move image display bars so as to perform an identical movement in order to provide transparent displays using afterimages or move at least one of the image display bars so as to perform a different movement in order to provide transparent displays using afterimages.

Advantageous Effects

According to the present invention, a transparent display device provides a transparent display using an afterimage only when an image display bar is moved such that the transparent display device is in a completely transparent state, whereby it is possible to prevent deterioration in visibility of an image due to deterioration of transmittance thereof.

In addition, it is possible to manufacture the transparent display device in the state in which transmittance thereof is set according to Equation 1.

In addition, it is possible to provide a three-dimensional image display apparatus capable of displaying a three-dimensional image using the transparent display device.

In addition, it is possible to easily realize a curved or double-sided display device.

DESCRIPTION OF DRAWINGS

FIG. 1 is a perspective view showing a transparent display device according to a first embodiment of the present invention.

FIG. 2 is a side view showing the transparent display device according to the first embodiment of the present invention.

FIG. 3 is a side view showing a modification of the transparent display device according to the first embodiment of the present invention.

FIG. 4 is a side sectional view showing another modification of the transparent display device according to the first embodiment of the present invention.

FIG. 5 is a perspective view showing a transparent display device according to a second embodiment of the present invention.

FIG. 6 is a side view showing the transparent display device according to the second embodiment of the present invention.

FIG. 7 is a side view showing a modification of the transparent display device according to the second embodiment of the present invention.

FIG. 8 is a side view showing another modification of the transparent display device according to the second embodiment of the present invention.

FIG. 9 is a perspective view showing a transparent display device according to a third embodiment of the present invention.

FIG. 10 is a side view showing a transparent display device according to the third embodiment of the present invention.

FIG. 11 is a perspective view showing a three-dimensional image display apparatus including a transparent display device according to a first embodiment of the present invention.

FIG. 12 is a side view showing the three-dimensional image display apparatus including the transparent display device according to the first embodiment of the present invention.

FIG. 13 is a perspective view showing a three-dimensional image display apparatus including a transparent display device according to a second embodiment of the present invention.

FIG. 14 is a side view showing the three-dimensional image display apparatus including the transparent display device according to the second embodiment of the present invention.

FIG. 15 is a perspective view showing a three-dimensional image display apparatus including a transparent display device according to a third embodiment of the present invention.

FIG. 16 is a side view showing the three-dimensional image display apparatus including the transparent display device according to the third embodiment of the present invention.

FIG. 17 is a perspective view showing a three-dimensional image display apparatus including a transparent display device according to a fourth embodiment of the present invention.

FIG. 18 is a side view showing the three-dimensional image display apparatus including the transparent display device according to the fourth embodiment of the present invention.

FIG. 19 is a side view showing a modification of the transparent display device according to the fourth embodiment of the present invention.

DESCRIPTION OF REFERENCE SYMBOLS

100: Transparent display device
110: Image display bar 111: Light-emitting devices
115: Timing controller 120, 130, 140: Bar driving units
121: Driving belt 123: Rollers
131: Linear motor 133: Moving body
141: Circular guide 150: Blocking plate
200: Display panel
300: Three-dimensional image display apparatus
IA: Entire display area (IA) HI: Transparent display using afterimage
RI: Opaque display

BEST MODE

Hereinafter, embodiments of the present invention will be described with reference to the accompanying drawings.

As shown in FIGS. 1 and 2, a transparent display device 100 according to a first embodiment of the present invention may include an image display bar 110.

The image display bar 110 may provide a transparent display HI using a visual afterimage, and a plurality of light-emitting devices 111 configured to emit light in order to display an afterimage may be arranged on the image display bar 110.

The image display bar 110 may be moved along a predetermined path by a bar driving unit 120, a description of which will follow, in order to display an image according to an afterimage.

The light-emitting devices 111 installed at the image display bar 110 may be arranged in numbers corresponding to pixels of a horizontal line or a vertical line of the transparent display HI using an entire afterimage to be provided, and may be arranged in a plurality of columns or rows so as to display a plurality of horizontal lines or vertical lines.

Of course, the number of columns or rows of the light-emitting devices 111 arranged on the image display bar 110 may be less than the number of pixels of the horizontal line or the vertical line of the transparent display HI using the entire afterimage.

In the light-emitting devices 111 installed at the image display bar 110, R, G, and B devices constitute a pixel, whereby it is possible to display colors based on color combinations.

In addition, the image display bar 110 may include a timing controller 115 configured to control the image display bar 110 in order to provide the display HI using the afterimage.

The timing controller 115 may control light emission of the light-emitting devices 111 based on the movement position of the image display bar 110 to provide the display HI using the afterimage.

As an example, in the case in which the image display bar 110 is disposed in a horizontal direction and is configured to perform rectilinear movement upwards and downwards, when the image display bar 110 passes through a position corresponding to each horizontal line of an image to be displayed in the entire region of the display HI using the afterimage, the timing controller 115 may instantaneously turn on a light-emitting device 11 of a pixel corresponding to the horizontal line at which the image display bar 110 is located such that the light-emitting device 11 emits light to provide the display HI using the afterimage.

Here, the movement speed of the image display bar 110 may be set in advance, and the timing controller 115 may recognize the position of the horizontal line based on the movement speed of the image display bar to turn on the light-emitting device 11 such that the light-emitting device 11 emits light, or a bar driving unit 120, a description of which will follow, may receive the movement speed of the image display bar 110 and may adjust timing at which the light-emitting device 11 emits light to provide the display HI using the afterimage.

As shown in FIGS. 1 and 3, the transparent display device 100 according to the first embodiment of the present invention may include a bar driving unit 120.

The bar driving unit 120 may move the image display bar 110 along a predetermined path such that the image display bar 110 provides the transparent display HI using the afterimage.

In the first embodiment, the bar driving unit 120 is configured to successively perform rectilinear movement and direction changing movement.

The bar driving unit 120 may include a driving belt 121.

The image display bar 110 may be coupled to the driving belt 121, and therefore the driving belt 121 may drive the image display bar 110 in a rotational direction of the driving belt.

The driving belt 121 may successively perform rectilinear movement for the image display bar 110 and direction changing movement in which, at the end of the rectilinear movement, the rectilinear movement is changed to rectilinear movement in an opposite direction, by rotation such that the transparent display HI using the afterimage is two-dimensionally provided by the image display bar 110.

At this time, the driving belt 121 may be configured such that a pair of rollers 123 each having a diameter less than the diameter of the driving belt 121 is installed so as to be spaced apart from each other and the driving belt 121 is disposed so as to be wound around the spaced rollers 123 in order to perform rectilinear movement between the spaced rollers 123 and to perform direction changing movement at the portion thereof at which each roller 123 is installed.

In addition, driving belts 121 may be installed at opposite ends of the image display bar 110.

Although the driving belt 121 is configured to be rotated about a horizontal axis in order to rotate the image display bar 110 in an upward direction or in a downward direction in the figures, the driving belt may be configured to be rotated about a vertical axis in order to rotate the image display bar 110 in a leftward direction or in a rightward direction.

Although the driving belt 121 is capable of being rotated by a driving motor only in one direction, the driving belt may also successively perform forward rotation and reverse rotation such that the driving belt is rectilinearly reciprocated in the rectilinear movement portion thereof.

The transparent display device 100 according to the first embodiment of the present invention may be manufactured in the state in which transparency thereof is set.

On the assumption that the entire display area IA in which the transparent display HI using the afterimage is provided is A and the area of the image display bar 110 is B, transparency may be set according to the following equation.

$$\text{Transparency }(\%)=((A-B)/A)*100 \quad \text{[Equation 1]}$$

For example, in the case in which the entire display area IA is 1800 cm$^2$ and transparency is set to 50%, the transparent display device may be manufactured in the state in which the area of the image display bar 110 is set to 900 cm$^2$ according to Equation 1 above.

Here, in the case in which the horizontal or vertical length of the display area is known, the width of the image display bar 110 may be set, since the horizontal or vertical length of the image display bar 110 is identical to the display area.

In the case in which the equation is used, as described above, transparency may be set in advance, whereby it is possible to easily manufacture the transparent display device.

As a modification of the bar driving unit 120 of the first embodiment, as shown in FIG. 3, a plurality of image display bars 110 may be installed at the driving belt 121.

The plurality of image display bars 110 may be installed at the driving belt 121 so as to be spaced apart from each other by a predetermined distance or to be opposite each other in order to provide transparent displays HI using same afterimages in the same rectilinear movement section, thereby providing a vivid afterimage or to provide transparent displays HI using different afterimages in opposite rectilinear movement sections, thereby providing an effect like a double-sided display device.

Here, in the case in which the image display bars 110 are configured to provide transparent displays HI using different afterimages in opposite rectilinear sections, a blocking plate 150, configured to block light between the transparent displays HI using the afterimages located at opposite sides such that people can watch transparent displays HI using vivid afterimages, may be installed at the middle portion of the driving belt 121 at which the rollers 123 are installed.

As another modification of the bar driving unit 120 of the first embodiment, as shown in FIG. 4, a plurality of image display bars 110 may be installed at the driving belt 121, and light-emitting devices 111 may be installed at opposite surfaces of each of the image display bars 110.

Here, the plurality of image display bars 110 installed at the driving belt 121 is installed in opposite directions of the driving belt 121. When one of the image display bars is located at the front of the driving belt 121, therefore, the other image display bar is located at the rear of the driving belt 121.

In the case in which the light-emitting devices 111 located at the front of the image display bar 110 located at the front of the driving belt 121 emit light, the light-emitting devices 111 located at the rear of the image display bar 110 located at the rear of the driving belt 121, i.e. the light-emitting devices 111 located in the same direction as the light emission direction of the light-emitting devices 111 of the image display bar 110 located at the front, emit light, whereby both the image display bar 110 located at the front and the image display bar 110 located at the rear in the state of being spaced apart from each other by the diameter of the roller 123 provide transparent displays HI using afterimages, and therefore it is possible to provide a transparent display HI using a three-dimensional afterimage due to overlapping of the transparent displays HI using the afterimages.

The operations and effects of the above components described above will be described.

In the transparent display device 100 according to the first embodiment of the present invention, the area of the image display bar 110 with respect to the entire display area IA is set using Equation 1 in order to set transparency of a transparent display HI using an afterimage.

When the area of the image display bar 110 is set, the image display bar 110 is installed at the driving belt 121.

At this time, the driving belt 121 may be installed so as to be rotated about the vertical axis or to be rotated about the horizontal axis. The driving belt 121 is disposed so as to be wound around the pair of spaced rollers 123, and the rollers 123 are rotated by the driving motor.

When the rollers 123 are rotated by the driving motor, the driving belt 121 is rotated to rotate the image display bar 110. When the image display bar 110 passes through a rectilinear movement section, which is between the rollers 123, around which opposite ends of the driving belt 121 are wound, the light-emitting devices 111 emit light to provide a transparent display HI using an afterimage.

Here, when all of the light-emitting devices 111 emit light in opposite rectilinear movement sections, in which movement directions are different from each other, transparent displays HI using afterimages are provided at opposite sides based on the rollers 123, whereby an effect like a double-sided display device may be provided.

In order to prevent images of the transparent displays HI using the afterimages at the opposite sides from being seen in the state of overlapping each other, the blocking plate 150 may be installed at the middle portion of the driving belt 121.

Also, in the case in which a plurality of image display bars 110 is installed at the driving belt 121, it is possible to provide a transparent display HI using a plurality of overlapping afterimages, or the plurality of image display bars 110 may display a single afterimage, whereby it is possible to provide a transparent display HI using a vivid afterimage.

Also, in the case in which light-emitting devices 111 are installed at opposite surfaces of each of the plurality of image display bars 110, a transparent display HI using an afterimage provided by the image display bar 110 located at the front and a transparent display HI using an afterimage provided by the image display bar 110 located at the rear may overlap each other, whereby it is possible to provide a transparent display HI using a three-dimensional afterimage.

In the transparent display device 100 according to the first embodiment of the present invention, therefore, transparency may be set based on the area of the image display bar 110 with respect to the display area, and then the transparent display device 100 may be manufactured.

In addition, a transparent display HI using an afterimage may be provided according to the movement of the image display bar 110 such that people can see an image based on the afterimage as needed, or the transparent display HI itself may be embodied so as not to be visible.

As shown in FIGS. 5 and 6, a second embodiment of the present invention is identical in construction to the first embodiment except for a bar driving unit 130.

In the second embodiment, the bar driving unit 130 may rectilinearly reciprocate the image display bar 110.

The bar driving unit 130 may be realized by a linear motor 131 capable of performing rectilinear reciprocation, and the image display bar 110 may be installed at a moving body 133 of the linear motor 131 such that the image display bar can be rectilinearly reciprocated.

In the bar driving unit 130 of the second embodiment constructed as described above, the image display bar 110 may be rectilinearly reciprocated by the linear motor 131, whereby a display cycle of a transparent display HI using an afterimage may be shortened, and therefore it is possible to provide a transparent display HI using a vivid afterimage.

Although the bar driving unit 130 is shown as moving the image display bar 110 upwards and downwards to provide a transparent display HI using an afterimage in the figures, the bar driving unit may be configured to move the image display bar leftwards and rightwards in order to provide a transparent display HI using an afterimage.

Light-emitting devices 111 may be installed at opposite surfaces of the image display bar 110 in order to provide transparent displays HI using the same afterimages or different afterimages at the opposite surfaces, whereby it is possible to impart the same effect as a double-sided display device.

At this time, the light-emitting devices 111 installed at the opposite surfaces of the image display bar 110 may have the same arrangements, or may have different arrangements in order to provide visual difference.

As a modification of the second embodiment, as shown in FIG. 7, the bar driving unit 130 is configured to perform curved reciprocation, rather than rectilinear reciprocation.

In the case in which the bar driving unit 130 performs curved reciprocation, the image display bar 110 may be moved on a curved line, whereby it is possible to provide a transparent display HI using an afterimage on a curved surface like a curved display device.

As a modification of the second embodiment, the bar driving unit 130 may also be realized by a linear motor 131.

As shown in FIG. 8, a bar driving unit 130 according to another modification of the second embodiment may include a pair of image display bars 110.

The pair of image display bars 110 may be configured such that light-emitting devices 111 are disposed at a moving body 133 of the linear motor 131 and are spaced apart from each other.

A blocking plate 150 may be installed between the pair of image display bars 110.

In the transparent display device constructed as described above, when the image display bars 110 are rectilinearly reciprocated by the bar driving unit 130, transparent displays HI using afterimages are provided at opposite sides in the state in which the blocking plate 150 is disposed therebetween, whereby it is possible to realize an effect like a double-sided display device.

In the transparent display device according to the second embodiment of the present invention, therefore, the bar driving unit 130 may perform rectilinear reciprocation or curved reciprocation, and therefore the display cycle of the transparent display HI using the afterimage is shorter than in the first embodiment, whereby it is possible to provide a transparent display HI using a vivid afterimage.

As shown in FIGS. 9 and 10, a third embodiment of the present invention is identical in construction to the first embodiment except for a bar driving unit 140.

In the third embodiment, the bar driving unit 140 may move the image display bar 110 in a circle or may move the image display bar 110 in an arc to display a transparent display HI using an afterimage.

The bar driving unit 140 may include a circular guide 141 configured to support the image display bar 110 so as to be spaced apart from a rotary shaft such that the image display bar 110 is moved about the rotary shaft in a circle and a driving motor configured to rotate the circular guide 141.

The image display bar 110 may be installed at the outer surface of the circular guide 141 such that the driving motor moves the circular guide 141 in a circle in one direction or repeatedly moves the circular guide 141 in a predetermined arc.

Here, the circular guide 141 may be rotated by the driving motor about the vertical axis or the horizontal axis.

In the case in which the transparent display HI using the afterimage is provided by the image display bar 110 moved in a circle or moved in an arc by the circular guide 141, as described above, an image may be displayed over the entire circumference thereof, as in a circular display device, a transparent display HI using an afterimage may be provided only in a predetermined arc, whereby it is possible to provide a transparent display HI using an afterimage in the state of being curved into a convex surface, as in an outwardly convex curved display device.

Here, in the case in which the image display bar 110 is installed at the inner surface of the circular guide 141, it is possible to provide a transparent display HI using an afterimage in the state of being curved in a concave surface, as in an inwardly concave curved display device.

Of course, even in the third embodiment, light-emitting devices 111 may be installed at opposite surfaces of the image display bar 110, whereby it is possible to have an effect like a double-sided display device enabling people to watch transparent displays HI using afterimages at the inside and the outside thereof.

In the transparent display device 100 according to the third embodiment of the present invention, therefore, the image display bar 110 may be moved in a circle or may be moved in an arc, whereby it is possible to provide a transparent display HI using an afterimage curved in the form of a curved surface.

Hereinafter, a three-dimensional image display apparatus 300 including a transparent display device according to an embodiment of the present invention will be described.

The transparent display device 100 according to any one of the first embodiment, the second embodiment, and the third embodiment may be applied to the three-dimensional image display apparatus 300 including the transparent display device according to the embodiment, and a detailed description of the transparent display device 100 will be omitted.

Meanwhile, the three-dimensional image display apparatus 300 including the transparent display device according to the embodiment of the present invention may include a display panel 200.

The display panel 200 may provide an opaque display RI that is actually visible, rather than an afterimage.

Meanwhile, the display panel 200 may be a panel, such as an OLED, an LCD, an e-ink display, or a PDP. Since various display devices capable of visually displaying an image are applicable, the kind of the display panel 200 is not restricted.

As shown in FIGS. 11 and 12, the transparent display device 100 according to the first embodiment is applied to a three-dimensional image display apparatus 300 including a transparent display device according to a first embodiment of the present invention.

The three-dimensional image display apparatus 300 including the transparent display device according to the first embodiment may include a display panel 200.

The display panel 200 may display an image of an opaque display RI having relation with a transparent display Hi using an afterimage, or may display an image of an opaque display RI having no relation with a transparent display Hi using an afterimage. The display panel 200 may be located at the rear of the transparent display Hi using the afterimage such that the transparent display Hi using the afterimage and the opaque display RI are seen by the image display bar 110 in an overlapping state.

In the first embodiment, the display panel 200 is disposed at the middle of the driving belt 121 between the pair of rollers 123 configured to support opposite ends of the driving belt 121, since an image based on an afterimage is displayed by the image display bar 110 at the front of the driving belt 121.

In the three-dimensional image display apparatus 300 including the transparent display device according to the first embodiment constructed as described above, the image display bar 110 is moved along the driving belt 121 according to rotation of the driving belt 121, a transparent display HI using an afterimage is provided by the image display bar 110, and the display panel 200 provides an opaque display RI, whereby it is possible to provide spectators with a three-dimensional image having a form in which the image of the transparent display HI using the afterimage and the image of the opaque display RI overlap each other.

Also, in the case in which rotation of the driving belt 121 is stopped, no transparent display HI using an afterimage is formed at the front of the display panel 200, and therefore it is possible to provide only an opaque display RI on the display panel 200 to spectators.

Consequently, the three-dimensional image display apparatus 300 including the transparent display device according to the first embodiment of the present invention is capable of combining an image of a transparent display HI using an afterimage provided by the transparent display device 100 and an image of an opaque display RI provided by the display panel 200 with each other to provide a three-dimensional image.

Also, in the case in which driving of the transparent display device 100 is stopped, no transparent display HI using an afterimage is visible at all, whereby it is possible for the display panel 200 to provide an image of a vivid opaque display RI.

As shown in FIGS. 13 and 14, the transparent display device 100 according to the second embodiment is applied to a three-dimensional image display apparatus 300 including a transparent display device according to a second embodiment of the present invention.

The three-dimensional image display apparatus 300 including the transparent display device according to the second embodiment of the present invention may include the display panel 200 of the three-dimensional image display apparatus according to the first embodiment, and the display panel 200 may be disposed at the rear of the image display bar 110.

At this time, the surface of the display panel 200 that provides an opaque display RI may be installed so as to face the same direction as the direction in which an image is displayed by a transparent display HI using an afterimage.

In the three-dimensional image display apparatus 300 including the transparent display device according to the second embodiment constructed as described above, when the bar driving unit 140 reciprocates the image display bar 110, the light-emitting devices 111 of the image display bar 110 emit light to form a transparent display HI using an afterimage.

At the same time, when the display panel 200 provides an opaque display RI, the transparent display HI using the afterimage is provided at the front of the opaque display RI. That is, the two images are visible in an overlapping state, whereby it is possible to provide a three-dimensional image.

Also, in the case in which driving of the transparent display device 100 is stopped, no transparent display HI using an afterimage is visible at all, whereby it is possible for the display panel 200 to provide a vivid opaque display RI.

Consequently, the three-dimensional image display apparatus 300 including the transparent display device according to the second embodiment of the present invention is capable of combining an image of a transparent display HI using an afterimage provided by the transparent display device 100 and an image of an opaque display RI provided by the display panel 200 with each other to provide a three-dimensional image.

Also, in the case in which driving of the transparent display device 100 is stopped, no transparent display HI using an afterimage is visible at all, whereby it is possible for the display panel 200 to provide a vivid opaque display RI.

In addition, a display cycle of a transparent display HI using an afterimage may be shortened according to reciprocation of the image display bar 110, whereby it is possible to provide a transparent display HI using a vivid afterimage.

As shown in FIGS. 15 and 16, the transparent display device 100 according to the third embodiment is applied to a three-dimensional image display apparatus 300 including a transparent display device according to a third embodiment of the present invention.

The three-dimensional image display apparatus 300 including the transparent display device according to the third embodiment of the present invention may include the display panel 200 of the three-dimensional image display apparatus according to the first embodiment, and the display panel 200 may be disposed at the rear of the image display bar 110.

At this time, the surface of the display panel 200 that provides an opaque display RI may be installed so as to face the same direction as the direction in which an image is displayed by the image display bar 110, which forms a transparent display HI using an afterimage.

Although the display panel 200 is shown as being flat in the figures, the display panel 200 may be curved so as to have a concentric circle with the bar driving unit 140, which moves the transparent display device 100 in a circle or in an arc.

In the three-dimensional image display apparatus 300 including the transparent display device according to the third embodiment constructed as described above, when the bar driving unit 140 moves the circular guide 141 in a circle or in an arc, the bar driving unit 140 provides a transparent display HI using an afterimage while moving the image display bar 110 in a circle or in an arc At the same time, when the display panel 200 provides an opaque display RI, the transparent display HI using the afterimage is provided at the front of the opaque display RI. That is, the two images are visible in an overlapping state, whereby it is possible to provide a three-dimensional image.

Consequently, the three-dimensional image display apparatus 300 including the transparent display device according to the third embodiment of the present invention is capable of combining an image of a transparent display HI using an afterimage provided by the transparent display device 100 and an image of an opaque display RI provided by the display panel 200 with each other to provide a three-dimensional image.

Also, in the case in which driving of the transparent display device 100 is stopped, no transparent display HI using an afterimage is visible at all, whereby it is possible for the display panel 200 to provide a vivid opaque display RI.

In addition, the bar driving unit 140 moves the image display bar 110 in a circle or in an arc to provide a curved transparent display HI using an afterimage, whereby it is possible to provide a three-dimensional image having an improved three-dimensional effect.

As shown in FIGS. 17 and 18, the transparent display device 100 according to the second embodiment is applied to a three-dimensional image display apparatus 300 including a transparent display device according to a fourth embodiment of the present invention.

The three-dimensional image display apparatus 300 including the transparent display device according to the fourth embodiment of the present invention may include a plurality of transparent display devices 100.

The plurality of transparent display devices 100 may be disposed in a line, and the plurality of transparent display devices 100 may provide transparent displays HI using identical afterimages or may provide transparent displays HI using different afterimages.

In the three-dimensional image display apparatus 300 including the transparent display device according to the fourth embodiment of the present invention constructed as described above, the plurality of transparent display devices 100 may be disposed in a line, whereby afterimages displayed on the respective transparent display devices 100 are visible in an overlapping state. Consequently, it is possible to provide a transparent displays HI using a three-dimensional afterimage.

As shown in FIG. 19, a three-dimensional image display apparatus 300 including a transparent display device according to a modification of the fourth embodiment may further include a display panel 200 described in the first embodiment.

The display panel may provide an image of an opaque display RI that is directly visible, rather than a transparent display HI using an afterimage.

In addition, the display panel 200 may be disposed at the rearmost of the plurality of transparent display devices 100 to provide an opaque display RI, whereby it is possible to provide a three-dimensional image obtained as the result of an image of the transparent display HI using the three-dimensional afterimage provided by the plurality of transparent display devices 100 and an image of the opaque display RI overlapping each other.

In the figure, the display panel 200 is shown as being disposed at the rearmost of the plurality of transparent display devices 100. In the case in which the display panel 200 is a transparent display panel 200 configured to transmit light, however, the display panel 200 may be disposed between the plurality of transparent display devices 100.

Consequently, the three-dimensional image display apparatus 300 including the transparent display device according to the fourth embodiment of the present invention is capable of combining images of transparent displays HI using afterimages provided by the transparent display devices 100 and an image of an opaque display RI provided by the display panel 200 with each other to provide a three-dimensional image.

Also, in the case in which driving of the transparent display devices 100 is stopped, no transparent display HI using an afterimage is visible at all, whereby it is possible for the display panel 200 to provide an image of a vivid opaque display RI.

In addition, the plurality of the transparent display devices 100 is installed, whereby it is possible to provide a three-dimensional image having an improved three-dimensional effect.

Although the embodiment of the present invention has been described above, the scope of right of the present invention is not limited thereto and includes all alterations and modifications within a range easily changed and recognized as being equivalent by a person having ordinary skill in the art to which the present invention pertains from the embodiment of the present invention.

The invention claimed is:

1. A transparent display device comprising:
   an image display bar having a plurality of light-emitting devices arranged thereon; and
   a bar driving unit configured to move the image display bar along a predetermined path such that the image display bar provides a transparent display using an afterimage according to movement of the light-emitting devices, wherein
   assuming that an entire display area of the transparent display using the afterimage is A and an area of the image display bar is B, transparency of the transparent display is set according to an equation of transparency (%)=((A−B)/A)*100,
   wherein the bar driving unit comprises a linear motor configured to rectilinearly reciprocate the image display bar,
   the image display bar comprises a pair of image display bars installed at the bar driving unit such that the light-emitting devices are opposite each other, and
   the transparent display device comprises a blocking plate disposed between the pair of image display bars, the blocking plate being configured to block light between transparent displays using afterimages.

2. The transparent display device according to claim 1, wherein the bar driving unit comprises:
   a driving belt to which the image display bar is fixed, the driving belt being configured to successively perform rectilinear movement for the image display bar and direction changing movement for changing a direction of the rectilinear movement; and
   a driving motor configured to rotate the driving belt.

3. The transparent display device according to claim 2, wherein the transparent display is a rectangular display formed by the rectilinear movement of the image display bar.

4. The transparent display device according to claim 2, wherein the image display bar is installed at the driving belt in numbers.

5. The transparent display device according to claim 1, wherein the transparent display is a rectangular display formed by the rectilinear movement of the image display bar.

6. The transparent display device according to claim 1, wherein the bar driving unit comprises a circular guide configured to move the image display bar in a circle or in an arc.

7. A three-dimensional image display apparatus comprising:
   a transparent display device comprising an image display bar having a plurality of light-emitting devices arranged thereon and a bar driving unit configured to move the image display bar along a predetermined path such that the image display bar provides a transparent display using an afterimage according to movement of the light-emitting devices; and
   an opaque display panel located at a rear of the image display bar, the opaque display panel being configured to provide an opaque display at a rear of the transparent display using the afterimage,
   wherein the bar driving unit comprises a linear motor configured to rectilinearly reciprocate the image display bar,
   the image display bar comprises a pair of image display bars installed at the bar driving unit such that the light-emitting devices are opposite each other, and
   the transparent display device comprises a blocking plate disposed between the pair of image display bars, the blocking plate being configured to block light between transparent displays using afterimages.

8. The three-dimensional image display apparatus according to claim 7, wherein, assuming that an entire display area of the transparent display using the afterimage is A and an area of the image display bar is B, transparency of the transparent display is set according to an equation of transparency (%)=((A−B)/A)*100.

9. The three-dimensional image display apparatus according to claim 7, wherein the bar driving unit comprises:
   a driving belt configured to successively perform rectilinear movement for the image display bar and direction changing movement for changing a direction of the rectilinear movement through rotation thereof; and
   a driving motor configured to rotate the driving belt.

10. The three-dimensional image display apparatus according to claim 9, wherein the image display bar is installed at the driving belt in numbers.

11. The three-dimensional image display apparatus according to claim 7, wherein the bar driving unit comprises a circular guide configured to move the image display bar in a circle or in an arc.

12. A three-dimensional image display apparatus comprising:
   a transparent display device comprising an image display bar having a plurality of light-emitting devices arranged thereon and a bar driving unit configured to move the image display bar along a predetermined path such that a transparent display using an afterimage is provided by the light-emitting devices, wherein
   assuming that an entire display area of the transparent display using the afterimage is A and an area of the image display bar is B, transparency of the transparent display is set according to an equation of transparency (%)=((A−B)/A)*100, wherein
   the transparent display device comprises a plurality of transparent display devices such that a plurality of transparent displays using afterimages is visible in an overlapping state, and wherein bar driving units of the plurality of transparent display devices move image display bars so as to perform an identical movement in order to provide transparent displays using afterimages or move at least one of the image display bars so as to perform a different movement in order to provide transparent displays using afterimages.

* * * * *